United States Patent
Nieh et al.

(10) Patent No.: US 12,265,650 B2
(45) Date of Patent: Apr. 1, 2025

(54) SYSTEMS, METHODS, AND MEDIA FOR PROTECTING APPLICATIONS FROM UNTRUSTED OPERATING SYSTEMS

(71) Applicant: The Trustees of Columbia University in the City of New York, New York, NY (US)

(72) Inventors: Jason Nieh, New York, NY (US); Alexander Edward Van't Hof, III, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 100 days.

(21) Appl. No.: 17/749,115

(22) Filed: May 19, 2022

(65) Prior Publication Data

US 2023/0098991 A1  Mar. 30, 2023

Related U.S. Application Data

(60) Provisional application No. 63/190,539, filed on May 19, 2021.

(51) Int. Cl.
*G06F 21/62* (2013.01)
*G06F 12/14* (2006.01)
(Continued)

(52) U.S. Cl.
CPC .......... *G06F 21/6281* (2013.01); *G06F 12/14* (2013.01); *G06F 21/53* (2013.01); *G06F 21/79* (2013.01)

(58) Field of Classification Search
CPC .. G06F 12/1009; G06F 12/08; G06F 12/1036; G06F 12/109; G06F 12/10;
(Continued)

(56) References Cited

U.S. PATENT DOCUMENTS 6,151,610 A   11/2000 Senn et al.
9,177,153 B1 * 11/2015 Perrig .................... G06F 21/57
(Continued)

OTHER PUBLICATIONS

J. Elwell, D. Evtyushkin, D. Ponomarev, N. Abu-Ghazaleh and R. Riley, "Hardening extended memory access control schemes with self-verified address spaces," 2017 IEEE/ACM International Conference on Computer-Aided Design (ICCAD), Irvine, CA, USA, 2017, pp. 392-399 (Year: 2017).*

(Continued)

*Primary Examiner* — Zhimei Zhu
(74) *Attorney, Agent, or Firm* — Byrne Poh LLP

(57) ABSTRACT

Mechanisms for protecting an application from an untrusted operating system (OS) are provided, the methods including: determining that a virtual address for a page of memory allocated by the untrusted OS for the application belongs to a valid mapping; determining that the page of memory is not already in use; and in response to determining that the virtual address for the page of memory belongs to a valid mapping and determining that the page of memory is not already in use, mapping the page of memory to an enclaved container for the application. Some mechanisms further include unmapping the page of memory from the untrusted OS. In some mechanism, determining that the virtual address for the page of memory belongs to a valid mapping is based on a list of valid mappings for the application.

18 Claims, 4 Drawing Sheets

(51) Int. Cl.
  *G06F 21/53* (2013.01)
  *G06F 21/79* (2013.01)
(58) Field of Classification Search
  CPC .. G06F 2212/151; G06F 12/14; G06F 12/145;
       G06F 12/1416; G06F 2009/45583; G06F
       21/70; G06F 21/79; G06F 2212/1052;
       G06F 2212/152; G06F 21/6281; G06F
       21/54; G06F 21/53
  See application file for complete search history.

(56) References Cited

U.S. PATENT DOCUMENTS

| | | | |
|---|---|---|---|
| 9,317,490 | B2 | 4/2016 | Cook |
| 9,442,752 | B1 | 9/2016 | Roth et al. |
| 9,792,222 | B2* | 10/2017 | Sahita ............... G06F 12/1009 |
| 9,983,894 | B2 | 5/2018 | Horovitz et al. |
| 10,324,863 | B2* | 6/2019 | Lemay ............... G06F 12/1009 |
| 10,372,945 | B2 | 8/2019 | Costa |
| 10,375,111 | B2 | 8/2019 | Schultz et al. |
| 10,505,917 | B2 | 12/2019 | Chhabra |
| 10,671,542 | B2* | 6/2020 | Shanbhogue ......... G06F 3/0673 |
| 10,705,976 | B2* | 7/2020 | Sahita ................. G06F 9/45558 |
| 10,721,290 | B2 | 7/2020 | Gill et al. |
| 10,740,128 | B2 | 8/2020 | Thomason |
| 10,776,459 | B2 | 9/2020 | Bojireddy et al. |
| 10,776,686 | B1 | 9/2020 | Jacob et al. |
| 11,520,906 | B2* | 12/2022 | Durham ............... G06F 12/109 |
| 2010/0122343 | A1 | 5/2010 | Ghosh et al. |
| 2011/0138474 | A1 | 6/2011 | Yee et al. |
| 2015/0301841 | A1* | 10/2015 | Mackintosh ............. G06F 8/52 717/136 |
| 2017/0068455 | A1* | 3/2017 | Xing ....................... G06F 21/10 |
| 2017/0097898 | A1* | 4/2017 | Durham ................ G06F 9/3005 |
| 2017/0249457 | A1* | 8/2017 | Tsirkin .................. G06F 3/0673 |

OTHER PUBLICATIONS

D. Evtyushkin, J. Elwell, M. Ozsoy, D. Ponomarev, N. A. Ghazaleh and R. Riley, "Flexible Hardware-Managed Isolated Execution: Architecture, Software Support and Applications," in IEEE Transactions on Dependable and Secure Computing, vol. 15, No. 3, pp. 437-451, May 1-Jun. 2018 (Year: 2018).*

John Criswell, Nathan Dautenhahn, Vikram Adve, "Virtual ghost: protecting applications from hostile operating systems", ASPLOS '14: Proceedings of the 19th international conference on Architectural support for programming languages and operating systems pp. 81-96 (Year: 2014).*

J. Jang et al., "PrivateZone: Providing a Private Execution Environment Using ARM TrustZone," in IEEE Transactions on Dependable and Secure Computing, vol. 15, No. 5, pp. 797-810, Sep. 1-Oct. 2018 (Year: 2018).*

Acharya, A. and Raje, M., "MAPbox: Using Parameterized Behavior Classes to Confine Applications", In Proceedings of the 9th USENIX Security Symposium (SSYM '00), Denver, CO, US,, Aug. 14-17, 2000, pp. 1-19.

Adobe Systems Incorporated, "Security Updates Available for Adobe Reader and Acrobat Versions 9 and Earlier", Mar. 24, 2009, available at: http://www.adobe.com/support/security/advisories/apsa09-01.html, pp. 1-3.

Amazon Web Services, Inc., "Building an Enclave Image File", last accessed Aug. 16, 2024, available at: https://docs.aws.amazon.com/enclaves/ latest/user/building-eif.html, pp. 1-3.

Amazon Web Services, Inc., "The Security Design of the AWS Nitro System: AWS Whitepaper", Feb. 15, 2024, available at: https://docs.aws.amazon.com/pdfs/whitepapers/latest/security-design-of-aws-nitro-system/security-design-of-aws-nitro-system.pdf, pp. 1-39.

ARM Ltd., "ARM CCA Security Model 1.0", Aug. 2021, available at: https://developer.arm.com/documentation/ DEN0096/A_a/?lang=en, pp. 1-68.

ARM Ltd., "Arm Confidential Compute Architecture", last accessed Oct. 19, 2021, available at: https://www.arm.com/ why-arm/ architecture/security-features/ arm-confidential-compute-architecture, pp. 1-11.

ARM Ltd., "Arm Neoverse N1 Core Technical Reference Manual", Apr. 2019, available at: https://developer.arm.com/documentation/100616/0400/, pp. 1-4.

ARM Ltd., "ARM Security Technology: Building a Secure System using TrustZone Technology", Technical Report, Apr. 2009, pp. 1-108.

ARM Ltd., "Realm Management Extension", Jun. 2021, available at: https://developer.arm.com/documentation/den0126/latest/, p. 1.3.

ARM Ltd., "Virtualization Host Extensions", Jan. 2019, available at: https://developer.arm.com/documentation/ 102142/0100/ Virtualization-Host-Extensions, pp. 1-4.

Arnautov, S., et al., "SCONE: Secure Linux Containers with Intel SGX", In Proceedings of the 12th USENIX Conference on Operating Systems Design and Implementation (OSDI 2016), Savannah, GA, US, Nov. 2-4, 2016, pp. 689-703.

Azab, A.M., et al., "Sice: A hardware-level strongly isolated computing environment for x86 multi-core platforms", In Proceedings of the 18th ACM Conference on Computer and Communications Security (CCS 2011), Oct. 17-21, 2011, pp. 375-388.

Backes, M., et al., "Preventing Side-Channel Leaks in Web Traffic: A Formal Approach", In 20th Annual Network and Distributed System Security Symposium (NDSS 2013), San Diego, CA, US, Feb. 24-27, 2013, pp. 1-17.

Bajaj, S., et al., "TrustedDB: a Trusted Hardware Based Database with Privacy and Data Confidentiality", In Proceedings of the 2011 ACM SIGMOD International Conference on Management of Data, Athens, GR, Jun. 12-16, 2011, pp. 205-216.

Baratto, R., et al., "THINC: A Remote Display Architecture for Thin-Client Computing", Technical Report CUCS-027-04, Columbia University, Jul. 2004, pp. 1-15.

Baumann, A., et al., "Shielding Applications from an Untrusted Cloud with Haven", In Proceedings of the 11th USENIX Conference on Operating Systems Design and Implementation (OSDI 2014), Broomfield, CO, US, Oct. 6-8, 2014, pp. 267-283.

Bellard, F., "QEMU, a Fast and Portable Dynamic Translator", In Proceedings of USENIX Annual Technical Conference, Anaheim, California, US, Apr. 10-Apr. 15, 2005, pp. 41-46.

Berman, A., et al., "TRON: Process-Specific File Protection for the UNIX Operating System", In Proceedings of the USENIX Winter Technical Conference (TCON '95), New Orleans, LA, US, Jan. 16-20, 1995, pp. 165-175.

Bitdefender, "Trojan.PWS.ChromeInject.B", Nov. 2008, available at: http://www.bitdefender.com/VIRUS-1000451-en--Trojan-PWS-ChromeInject-B.html, pp. 1-3.

Brasser, F., "Sanctuary: Arming trustzone with user-space enclaves", In Proceedings 2019 Network and Distributed System Security Symposium, San Diego, CA, US, Feb. 24-27, 2019, pp. 1-15.

Brasser, F., et al., "Special Session: Advances and Throwbacks in Hardware-Assisted Security", IEEE, In Proceedings of 2018 International Conference on Compilers, Architectures and Synthesis for Embedded Systems (CASES), Turin, IT, Sep. 30-Oct. 5, 2018, pp. 1-10.

Business Wire, "Research and Markets: Global Encryption Software Market (Usage, Vertical and Geography)—Size, Global Trends, Company Profiles, Segmentation and Forecast, 2013-2020 ", Feb. 11, 2015, pp. 1-3.

Chan, H., et al., "Random Key Predistribution Schemes for Sensor Networks", IEEE, In Proceedings of the 2003 Symposium on Security and Privacy, Berkeley, CA, US, May 11-14, 2003, pp. 197-213.

Checkoway, S. and Shacham, H., "Iago Attacks: Why the System Call API is a Bad Untrusted RPC Interface", In Proceedings of the 18th International Conference on Architectural Support for Programming Languages and Operating Systems (ASPLOS 2013), Houston, TX, US, Mar. 16, 2013, pp. 253-264.

Chen, H., et al., "Tamper-Resistant Execution in an Untrusted Operating System Using A Virtual Machine Monitor", Technical Report PPITR-2007-08001, Parallel Processing Institute, Fudan University, Aug. 2007, pp. 1-17.

(56) References Cited

OTHER PUBLICATIONS

Chen, X., et al., "Overshadow: A Virtualization-based Approach to Retrofitting Protection in Commodity Operating Systems", In Proc. of the 13th Intl. Conf. on Architectural Support for Programming Languages and Operating Systems, Seattle, WA, US, Mar. 1-5, 2008, pp. 1-12.
Cheng, Y., et al., "Efficient Virtualization-Based Application Protection against Untrusted Operating System", In Proceedings of the 10th ACM Symposium on Information, Computer and Communications Security (ASIACCS 2015), Singapore, SG, Apr. 2015, pp. 345-356.
Cooper, B. F., et al., "Benchmarking Cloud Serving Systems with YCSB", In Proceedings of the 1st ACM Symposium on Cloud Computing, Indianapolis, IN, US, Jun. 10-11, 2010, pp. 143-154.
Costan, V., et al., "Sanctum: Minimal hardware extensions for strong software isolation", In 25th USENIX Security Symposium (USENIX Security 2016), Austin, TX, US, Aug. 10-12, 2016, pp. 857-874.
Cowan, C et al., "SubDomain: Parsimonious Server Security", In Proceedings of the 14th USENIX System Administration Conference (LISA '00), New Orleans, LA, US, Dec. 3-8, 2000, pp. 341-354.
Cui, J., et al., "Dynamic Binary Translation for SGX Enclaves", In ACM Transactions on Privacy and Security, vol. 25, No. 4, Nov. 2022, pp. 1-40.
Dall, C., et al., "ARM Virtualization: Performance and Architectural Implications", In Proceedings of the 43rd International Symposium on Computer Architecture (ISCA 2016), Seoul, KR, Jun. 18-22, 2016, pp. 304-316.
Dall, C., et al., "Optimizing the Design and Implementation of the Linux ARM Hypervisor", In Proceedings of the 2017 USENIX Annual Technical Conference (USENIX ATC '17), Santa Clara, CA, US, Jul. 12-14, 2017, pp. 1-15.
Docker, Inc., "Empowering App Development for Developers—Docker", last accessed Aug. 16, 2024, available at: https://www.docker.com, pp. 1-11.
Ferraiuolo, A., et al., "Komodo: Using Verification to Disentangle Secure-Enclave Hardware from Software", In Proceedings of the 26th Symposium on Operating Systems Principles, Shanghai, CN, Oct. 28, 2017, pp. 287-305.
Fox, A.C.J., et al., "A Verification Methodology for the Arm Confidential Computing Architecture: From a Secure Specification to Safe Implementations", In Proceedings of hte ACM on Programming Languages, vol. 7, No. 88, Apr. 2023, pp. 376-405.
Gettys, J. and Scheifler, R.W., "Xlib-C Language X Interface", X Consortium, Inc., (month unknown) 1996, pp. 1-466.
Gilmore, M., "-10 Day CERT Advisory on PDF Files", Jun. 13, 2003, available at: http://seclists.org/fulldisclosure/2003/Jun/0463.html, pp. 1-3.
Github, "Confidential Containers", last accessed Aug. 19, 2024, available at: https://github.com/confidential-containers, pp. 1-5.
Github, "foreign-dlopen", last accessed Aug. 19, 2024, available at: https://github.com/pfalcon/foreign-dlopen, pp. 1-5.
Github, "Open Enclave", last accessed Aug. 19, 2024, available at: https://github.com/openenclave/openenclave, pp. 1-4.
Github, "Sysbench", v1.0.20, last accessed Aug. 19, 2024, available at: https://github.com/akopytov/sysbench, pp. 1-7.
Google, Inc., "GoogleContainerTools/distroless: Language Focused Docker Images, Minus the Operating System", last accessed Aug. 19, 2024, available at: https://github.com/GoogleContainerTools/distroless, pp. 1-8.
Google, Inc., "gVisor: Application Kernel for Containers", last accessed Aug. 16, 2024, available at: https://github.com/google/gvisor, pp. 1-5.
Google, Inc., "HTTPS encryption on the web—Google Transparency Report", last accessed Aug. 19, 2024, available at: https://transparencyreport.google.com/https/overview, pp. 1-6.
Gu, G., et al., "BotSniffer: Detecting Botnet Command and Control Channels in Network Traffic", In Proceedings of the 15th Annual Network and Distributed System Security Symposium, San Diego, CA, US, Feb. 10-13, 2008, pp. 1-18.
Gu, R., et al., "CertiKOS: An Extensible Architecture for Building Certified Concurrent OS Kernels", In Proceedings of the 12th Symposium on Operating Systems Design and Implementation, Savannah, GA, US, Nov. 2-4, 2016, pp. 653-669.
Guan, L., et al., "Trustshadow: Secure Execution of Unmodified Applications with Arm Trustzone", In Proceedings of the 15th Annual International Conference on Mobile Systems, Applications, and Services (MobiSys 2017, Niagara Falls, NY, US, Jun. 2017, pp. 488-501.
Hajnoczi, S., "An Updated Overview of the QEMU Storage Stack", Presentation, IBM Linux Technology Center, Jun. 2011, pp. 1-26.
Heiser, G. and Leslie, B. "The OKL4 Microvisor: Convergence Point of Microkernels and Hypervisors", In Proceedings of the 1st ACM Asia-pacific Workshop on Workshop on Systems (APSys 2010), New Delhi, IN, Aug. 30, 2010, pp. 19-24.
Hofmann, O.S., et al., "InkTag: Secure Applications on an Untrusted Operating System", In Proceedings of the 18th International Conference on Architectural Support for Programming Languages and Operating Systems (ASPLOS 2013), Houston, TX, US, Mar. 16-20, 2013, pp. 265-278.
Hua, Z., et al., "TZ-Container: Protecting Container from Untrusted OS with ARMTrustZone", In Science China Information Sciences, vol. 64, Aug. 2021, pp. 1-17.
Hykes, S., "Introducing runC: A lightweight Universal Container Runtime", availabl at: https://www.docker.com/blog/runc/, Jun. 22, 2015, pp. 1-7.
Intel Corporation, "Intel Software Guard Extensions Programming Reference", available at: https://software.intel.com/sites/default/files/managed/48/88/329298-002.pdf, Oct. 2014, pp. 1-186.
Intel Corporation, "Intel Trust Domain Extensions", last accessed Aug. 19, 2024, available at: https://www.intel.com/content/www/us/en/developer/articles/technical/intel-trust-domain-extensions.html, pp. 1-7.
International Organization for Standardization and International Electrotechnical Commission, "Information technology—Trusted platform module library", Technical Report ISO/IEC 11889-1:2015, available at: https://www.iso.org/standard/66510.html, Apr. 1, 2016, pp. 1-278.
Irazoqui, G., et al., "S$A: A Shared Cache Attack That Works Across Cores and Defies VM Sandboxing—and Its Application to AES", In Proceedings of the 2015 IEEE Symposium on Security and Privacy (SP 2015), San Jose, CA, US, May 17-21, 2015, pp. 591-604.
Jain, S., et al. "Application-Level Isolation and Recovery with Solitude", In Proceedings of the 3rd ACM SIGOPS/EuroSys European Conference on Computer Systems (EuroSys '08), Glasgow, Scotland, UK, Apr. 1-4, 2008, pp. 95-107.
Jones, R., "Netperf", last accessed Aug. 19, 2024, available at: https://github.com/HewlettPackard/netperf, pp. 1-4.
Kamp, p. H. and Watson, R.N.M., "Jails: Confining the Omnipotent Root", In Proceedings of the 2nd International SANE Conference, Maastricht, NL, May 22-25, 2000, pp. 1-15.
Kata Containers Community, "Kata Containers", last accessed Aug. 19, 2024, available at: https://katacontainers.io/, pp. 1-4.
Klein, G., et al., "seL4: Formal Verification of an OS Kernel", In Proceedings of the 22nd ACM Symposium on Operating Systems Principles, Big Sky, MT, US, Oct. 11-14, 2009, pp. 207-220.
KVM Contributors, "Tuning KVM", KVM, last accessed Aug. 20, 2024, available at: https://www.linux-kvm.org/page/Tuning_KVM, pp. 1-2.
Kwon, Y., et al., Sego: Pervasive trusted metadata for efficiently verified untrusted system services. In Proceedings of the Twenty-First International Conference on Architectural Support for Programming Languages and Operating Systems (ASPLOS 2016), Atlanta, GA, US, Apr. 2-6, 2016, pp. 277-290.
Lampson, B., "Accountability and Freedom", Sep. 26, 2005, available at: http://research.microsoft.com/en-us/um/people/blampson/Slides/AccountabilityAndFreedomAbstract.htm, pp. 1-26.
Landau, S., "Making Sense from Snowden: What's Significant in the NSA Surveillance Revelations", In IEEE Security & Privacy, vol. 11, No. 4, Jul.-Aug. 2013, pp. 54-63.

(56) References Cited

OTHER PUBLICATIONS

Let's Encrypt, "Let's encrypt stats—let's encrypt", last accessed Aug. 19, 2024, available at: https://letsencrypt.org/stats/, pp. 1-2.
Li, S.W., et al., "Protecting Cloud Virtual Machines from Hypervisor and Host Operating System Exploits", In Proceedings of the 28th USENIX Security Symposium, Santa Clara, CA, US, Aug. 14-16, 2019, pp. 1-19.
Li, X., et al., "Design and Verification of the Arm Confidential Compute Architecture", In Proceedings of 16th USENIX Symposium on Operating Systems Design and Implementation (OSDI 22), Carlsbad, CA, US, Jul. 11-13, 2022, pp. 465-484.
Liang, Z., "Isolated Program Execution: An Application Transparent Approach for Executing Untrusted Programs", In Proceedings of the 19th Annual Computer Security Applications Conference, Las Vegas, NV, US, Dec. 8-12, 2003, pp. 182-191.
Linux Container Hardening Project, "Linux Container Hardening", last accessed Aug. 19, 2024, available at: https://containerhardening.org/, pp. 1-5.
Liu, F., et al., "Last-Level Cache Side-Channel Attacks Are Practical", In Proceedings of the 2015 IEEE Symposium on Security and Privacy (SP 2015), San Jose, CA, US, May 17-21, 2015, pp. 605-622.
Loscocco, P. and Smalley, S., "Integrating Flexible Support for Security Policies into the Linux Operating System", In Proceedings of the FREENIX Track: 2001 USENIX Annual Technical Conference, Boston, MA, USA, Jun. 25-30, 2001, pp. 29-40.
LTP Developers, "LTP—Linux Test Project", last accessed Aug. 19, 2024, available at: https://linux-test-project.github.io/, pp. 1-3.
Lu, S., et al., "Sequential Aggregate Signatures and Multisignatures without Random Oracles", In Advances in Cryptology—EUROCRYPT 2006, Lecture Notes in Computer Science, vol. 4004, St. Perersburg, RU, May 28-Jun. 1, 2006, pp. 465-485.
Madhavapeddy, A., et al., "Unikernels: Library operating systems for the cloud", In ACM SIGARCH Computer Architecture News, vol. 41, No. 1, Mar. 2013, pp. 461-472.
McCune, J.M., et al., "TrustVisor: Efficient TCB Reduction and Attestation", In Proceedings of the IEEE Symposium on Security and Privacy, Oakland, CA, US, May 16-19, 2010, pp. 143-158.
McVoy, L. and Staelin, C., "Imbench: Portable tools for performance analysis", In USENIX 1996 Annual Technical Conference (USENIX ATC 1996), San Diego, CA, US, Jan. 1996, pp. 279-294.
MongoDB, Inc., "Mongodb", last accessed Aug. 19, 2024, available at: https://www.mongodb.com, pp. 1-13.
Nginx, Inc., "Nginx", last accessed Aug. 19, 2024, available at: https://www.nginx.com/, pp. 1-4.
Office Action dated Nov. 9, 2012 in U.S. Appl. No. 13/104,246, pp. 1-25.
Oracle Corporation, "Mysql", last accessed Aug. 19, 2024, available at: https://www.mysql.com, pp. 1-3.
Osman, S. et al., "The Design and Implementation of ZAP: A System for Migrating Computing Environments", In Proceedings of the 5th Symposium on Operating Systems Design and Implementation, Boston, MA, US, Dec. 2002, pp. 1-16.
Pfaff, B., et al., "Virtualization Aware File Systems: Getting Beyond the Limitations of Virtual Disks", In Proceedings of the 3rd Symposium on Networked Systems Design & Implementation (NSDI '06), May 8-10, 2006, pp. 353-366.
Porter, T. and Duff, T., "Compositing Digital Images", In ACM SIGGARCH Computer Graphics, vol. 18, No. 3, Jul. 1984, pp. 253-259.
Price, D. and Tucker, A., "Solaris Zones: Operating System Support for Consolidating Commercial Workloads", In Proceedings of the 18th Large Installation System Administration Conference (LISA '04), Atlanta, GA, US, Nov. 14-19, 2004, pp. 243-256.
Priebe, C., et al., "SGX-LKL: Securing the host os interface for trusted execution", In ArXiv, abs/1908.11143, Aug. 2019, pp. 1-17.
Provos, N., "Improving Host Security with System Call Policies", In Proceedings of the 12th USENIX Security Symposium (SSYM '03), Washington, DC, US, Aug. 4-8, 2003, pp. 257-272.
Redhat, "Podman: The next gernation of linux container tools", last accessed Aug. 19, 2024, available at: https://podman.io/, pp. 1-8.
Redis Labs, "memtier_benchmark", last accessed Aug. 19, 2024, available at: https://github.com/RedisLabs/memtier_benchmark, pp. 1-9.
Redis Labs, "Redis Libraries and Tools", last accessed Aug. 19, 2024, available at: https://redis.io/tools, pp. 1-6.
Redis Labs, "Redis", last accessed Aug. 19, 2024, available at: https://redis.io/, pp. 1-8.
Reis, C. and Gribble, S.D., "Isolating Web Programs in Modern Browser Architectures", In Proceedings of the 4th ACM European Conference on Computer Systems (EuroSys '09), Nuremberg, DE, Apr. 1-3, 2009, pp. 219-232.
Ristenpart, T., et al., "Hey, You, Get off of My Cloud: Exploring Information Leakage in Third-party Compute Clouds", In Proceedings of the 16th ACM Conference on Computer and Communications Security (CCS 2009), Chicago, IL, US, Nov. 2009, pp. 199-212.
Roemer, R., et al., "Return-Oriented Programming: Systems, languages, and applications", In ACM Transactions on Information and System Security, vol. 15, No. 1, Mar. 2012, pp. 1-42.
Russell. R., "Hackbench", last accessed Jan. 19, 2008, available at: http://people.redhat.com/mingo/cfs-scheduler/tools/hackbench.c, pp. 1-3.
Sadeghi, A.R., et al., "Security and Privacy Challenges in Industrial Internet of Things", In Proceedings of the 52nd Annual Design Automation Conference, San Francisco, CA, US, Jun. 7-11, 2015, pp. 1-6.
Saltzer, J.H., et al., "End-to-end Arguments in System Design", In ACM Transactions on Computer Systems (TOCS), vol. 2, No. 4, Nov. 1984, pp. 277-288.
Samsung Electronics Co., Ltd., "Samsung Knox—White Paper", last accessed Aug. 19, 2024, available at: https://docs.samsungknox.com/admin/whitepaper/kpe/samsung-knox.htm, pp. 1-8.
Shacham, H., "The Geometry of Innocent Flesh on the Bone: Return-into-Libc Without Function Calls (On the x86)", Proceedings of the 14th ACM Conference on Computer and Communications Security (CCS '07), Alexandria, VA, USA, Oct. 29-Nov. 2, 2007, pp. 552-561.
Shen, Y., et al., "Occlum: Secure and efficient multitasking inside a single enclave of intel sgx", In Proceedings of the Twenty-Fifth International Conference on Architectural Support for Programming Languages and Operating Systems (ASPLOS 2020), Mar. 2020, pp. 955-970.
Shen, Z., et al., "X-containers: Breaking down barriers to improve performance and isolation of cloud-native containers", In Proceedings of the Twenty-Fourth International Conference on Architectural Support for Programming Languages and Operating Systems, Apr. 2019, pp. 121-135.
Soares, L. and Stumm, M., "FlexSC: Flexible System Call Scheduling with Exception-Less System Calls", In 9th USENIX Symposium on Operating Systems Design and Implementation (OSDI 10), Vancouver, BC, CA, Oct. 4-6, 2010, pp. 1-14.
Soltesz, S., et al., "Container-Based Operating System Virtualization: A Scalable, High Performance Alternative to Hypervisors", In Proceedings of the 2007 EuroSys Conference (EuroSys '07), Lisbon, PT, Mar. 21-23, 2007, pp. 275-287.
Steinberg, U. and Kauer, B., "NOVA: A Microhypervisor-based Secure Virtualization Architecture", In Proceedings of the 5th European Conference on Computer Systems (EuroSys 2010), Paris, FR, Apr. 2010, pp. 209-222.
Stewin, P. and Bystrov, I., "Understanding DMA Malware", In Proceedings of the 9th International Conference on Detection of Intrusions and Malware, and Vulnerability Assessment (DIMVA 2012), , Heraklion, Crete, GR, Jul. 26-27, 2013, pp. 21-41.
Sun Microsystems, Inc., "Solaris ZFS Administration Guide", Jan. 2010, available at: http://docs.oracle.com/cd/E19082-01/817-2271/817-2271.pdf, pp. 1-318.
Suse, "Performance Implications of Cache Modes", Jul. 30, 2021, available at: https://documentation.suse.com/sles/11-SP4/html/SLES-all/cha-qemu-cachemodes.html, pp. 1-5.

(56) References Cited

OTHER PUBLICATIONS

The Apache Software Foundation, "ab—Apache HTTP server benchmarking tool", last accessed Aug. 19, 2024, available at: http://httpd.apache.org/docs/2.4/programs/ab.html, pp. 1-4.
The Kubernetes Authors, "Persistent Volumes", last modified Jul. 26, 2024, available at: https://kubernetes.io/docs/concepts/storage/persistent-volumes/, pp. 1-22.
The Kubernetes Authors, "Working with Pods", last modified Jul. 29, 2024, available at: https://kubernetes.io/docs/concepts/workloads/pods/#working-with-pods, pp. 1-7.
Trusted Firmware Community, "Trusted Firmware—A", last accessed Aug. 19, 2024, available at: https://developer.arm.com/Tools%20and%20Software/Trusted%20Firmware-A, pp. 1-3.
Tsai, C.C., et al., "Graphene—SGX: A practical library OS for unmodified applications on SGX", In Proceedings of the 2017 USENIX Annual Technical Conference (USENIX ATC 2017), Santa Clara, CA, US, Jul. 12-14, 2017, pp. 645-658.
U.S. Appl. No. 13/104,246, filed May 10, 2011, pp. 1-20.
U.S. Appl. No. 61/333,518, filed May 11, 2010, pp. 1-19.
U.S. Appl. No. 63/190,539, filed May 19, 2021, pp. 1-19.
U.S. Appl. No. 63/553,979, filed Feb. 15, 2024, pp. 1-23.
Van't Hof, A. and Nieh, J., "BlackBox: A Container Security Monitor for Protecting Containers on Untrusted Operating Systems", In Proceedings of the 16th USENIX Symposium on Operating Systems Design and Implementation (OSDI 2022), Carlsbad, CA, US, Jul. 11-13, 2022, pp. 1-19.
VMware Inc., "VMware Workstation 6.5 Release Notes", Oct. 15, 2008, available at: http://www.wmvare.com/support/ws65/doc/releasenotes_ws65.html, pp. 1-5.
Wagner, D.A., "Janus: An Approach for Confinement of Untrusted Applications", Master's Thesis, University of California, Aug. 1999, pp. 1-65.
Whitaker, A et al., "Scale and Performance in the Denali Isolation Kernel", In Proceedings of the Fifth Symposium on Operating Systems Design and Implementation (OSDI '02), Boston, MA, US, Dec. 9-11, 2002, pp. 195-209.
White Paper, "AMD SEV-SNP: Stengthening VM Isolation with Integrity Protection and More", Solutions Brief, Jan. 2020, pp. 1-20.
Wright, C., et al., "Versatility and Unix Semantics in a Fan-Out Unification File System", Technical Report FSL-04-01b, Stony Brook University, Jan. 2004, pp. 1-14.
Yang, J. and Shin, K.G., "Using Hypervisor to Provide Data Secrecy for User Applications on a Per-page Basis", In Proc. of the 4th ACM SIGPLAN/SIGOPS Intl. Conf. on Virtual Execution Environments, Seattle, WA, US, Mar. 5-7, 2008, pp. 1-10.
Zhang, Y., et al., "Cross-Tenant Side-Channel Attacks in Paas Clouds", In Proceedings of the 2014 ACM SIGSAC Conference on Computer and Communications Security (CCS 2014), Nov. 2014, pp. 990-1003.
Zhang, Y., et al., "Cross-VM Side Channels and Their Use to Extract Private Keys", In Proceedings of the 2012 ACM Conference on Computer and Communications Security (CCS 2012), Raleigh, NC, US, Oct. 16-18, 2012, pp. 1-78.
Zhang, Y., et al., "Shelter: Extending ARM CCA with Isolation in User Space", In Proceedings of the 32nd USENIX Secutity Symposium, Anaheim, CA, US, Aug. 9-11, 2023, pp. 1-19.
Zinzindohoué, J. K., et al., "Hacl*: A verified modern cryptographic library", In Proceedings of the 2017 ACM SIGSAC Conference on Computer and Communications Security (CCS 2017), Dallas, TX, US, Oct. 20-Nov. 3, 2017, pp. 1789-1806.

\* cited by examiner

SYSTEMS, METHODS, AND MEDIA FOR PROTECTING APPLICATIONS FROM UNTRUSTED OPERATING SYSTEMS

CROSS-REFERENCE TO RELATED APPLICATIONS

This application claims the benefit of U.S. Provisional Patent Application No. 63/190,539, filed May 19, 2021, which is hereby incorporated by reference herein in its entirety.

STATEMENT REGARDING GOVERNMENT FUNDED RESEARCH AND DEVELOPMENT

This invention was made with government support under N66001-21-C-4018 awarded by AFMCLO/JAZ and 2052947, 1918400, and 2124080 awarded by the National Science Foundation. The government has certain rights in the invention.

BACKGROUND

Containers are widely deployed to package, isolate, and multiplex applications on shared computing infrastructure. They are increasingly used in lieu of hypervisor-based virtual machines (VMs) because of their faster startup time, lower resource footprint, and better I/O performance. Popular container mechanisms such as LINUX containers rely on a commodity operating system (OS) to enforce their security guarantees. However, commodity OSes such as LINUX are huge, complex, and imperfect pieces of software. Attackers that successfully exploit OS vulnerabilities may gain unfettered access to container data, compromising the confidentiality and integrity of containers—an undesirable outcome for both computing service providers and their users.

Modern systems increasingly incorporate hardware security mechanisms to protect applications from untrusted OSes, such as INTEL SOFTWARE GUARD EXTENSIONS (SGX) and ARM TRUSTZONE, but they require rewriting applications and may impose high overhead to use OS services. Some approaches have built on these mechanisms to attempt to mitigate their programmability limitations and extend their functionality to protect unmodified applications or containers. Unfortunately, they suffer from high overhead, incomplete and limited functionality, and massively increase the trusted computing base (TCB) through a library OS or runtime system, potentially trading one large vulnerable TCB for another.

As an alternative, various approaches have augmented hypervisors with additional mechanisms to protect applications from untrusted OSes. Unfortunately, this incurs the performance overhead of hypervisor-based virtualization, which containers were designed to avoid. Furthermore, the TCB of these systems is significant, in some cases including an additional commodity host OS, providing additional vulnerabilities to exploit to compromise applications. Theoretically, these approaches could be applied to microhypervisors which claim to provide smaller TCBs. Unfortunately, microhypervisors still inherit the fundamental complexity of hypervisor-based virtualization, including virtualization and resource management of hardware, and their reduction in TCB is achieved at a cost of a significantly reduced feature set and limited hardware support. For any microhypervisor to be used in practice, its complexity will likely increase significantly just to be able to run on a reasonable number of hardware platforms.

Accordingly, new mechanisms for protecting applications from untrusted operating systems are desirable.

SUMMARY

In accordance with embodiment some embodiments, systems, methods, and media for protecting applications from untrusted operating systems are provided.

In some embodiments, systems for protecting an application from an untrusted operating system (OS) are provided, the systems comprising: memory; and a hardware processor coupled to the memory and configured to: determine that a virtual address for a page of memory allocated by the untrusted OS for the application belongs to a valid mapping; determine that the page of memory is not already in use; and in response to determining that the virtual address for the page of memory belongs to a valid mapping and determining that the page of memory is not already in use, map the page of memory to an enclaved container for the application.

In some of these embodiments, the hardware processor is further configured to unmap the page of memory from the untrusted OS.

In some of these embodiments, determining that the virtual address for the page of memory belongs to a valid mapping is based on a list of valid mappings for the application.

In some of these embodiments, the list of valid mappings is built by interposing on system calls that adjust memory mappings.

In some of these embodiments, the hardware processor is further configured to: make active a first nested page table of the untrusted OS such that the untrusted OS is unable to access private physical memory mapped into a second nested page table of the enclaved container for the application; and while the first nested page table is active: transfer CPU control to the untrusted OS so that the untrusted OS can perform exception handling for the application; verify that an exception return address corresponds to a trusted exception vector; determine that a running task belongs to the enclaved container; and in response to determining that the running task belongs to the enclaved container, make active the second nested page table so that the task can access a memory state of the second nested page table. In some of these embodiments, the hardware processor is further configured to copy system call arguments from a syscall buffer of the enclaved container to a syscall buffer of the untrusted OS. In some of these embodiments, the hardware processor is still further configured to copy modified system call arguments from the syscall buffer of the untrusted OS to the syscall buffer of the enclaved container.

In some embodiments, methods for protecting an application from an untrusted operating system (OS) are provided, the methods comprising: determining that a virtual address for a page of memory allocated by the untrusted OS for the application belongs to a valid mapping; determining that the page of memory is not already in use; and in response to determining that the virtual address for the page of memory belongs to a valid mapping and determining that the page of memory is not already in use, mapping the page of memory to an enclaved container for the application.

In some of these embodiments, the method further comprises unmapping the page of memory from the untrusted OS.

In some of these embodiments, determining that the virtual address for the page of memory belongs to a valid mapping is based on a list of valid mappings for the application.

In some of these embodiments, the list of valid mappings is built by interposing on system calls that adjust memory mappings.

In some of these embodiments, the method further comprises: making active a first nested page table of the untrusted OS such that the untrusted OS is unable to access private physical memory mapped into a second nested page table of the enclaved container for the application; and while the first nested page table is active: transferring CPU control to the untrusted OS so that the untrusted OS can perform exception handling for the application; verifying that an exception return address corresponds to a trusted exception vector; determining that a running task belongs to the enclaved container; and in response to determining that the running task belongs to the enclaved container, making active the second nested page table so that the task can access a memory state of the second nested page table. In some of these embodiments, the method further comprises: copying system call arguments from a syscall buffer of the enclaved container to a syscall buffer of the untrusted OS. In some of these embodiments, the method still further comprises: copying modified system call arguments from the syscall buffer of the untrusted OS to the syscall buffer of the enclaved container.

In some embodiments, non-transitory computer-readable media containing computer executable instructions that, when executed by a processor, cause the processor to perform a method for protecting an application from an untrusted operating system (OS) are provided, the method comprising: determining that a virtual address for a page of memory allocated by the untrusted OS for the application belongs to a valid mapping; determining that the page of memory is not already in use; and in response to determining that the virtual address for the page of memory belongs to a valid mapping and determining that the page of memory is not already in use, mapping the page of memory to an enclaved container for the application.

In some of these embodiments, the method further comprises unmapping the page of memory from the untrusted OS.

In some of these embodiments, determining that the virtual address for the page of memory belongs to a valid mapping is based on a list of valid mappings for the application.

In some of these embodiments, the list of valid mappings is built by interposing on system calls that adjust memory mappings.

In some of these embodiments, the method further comprises: making active a first nested page table of the untrusted OS such that the untrusted OS is unable to access private physical memory mapped into a second nested page table of the enclaved container for the application; and while the first nested page table is active: transferring CPU control to the untrusted OS so that the untrusted OS can perform exception handling for the application; verifying that an exception return address corresponds to a trusted exception vector; determining that a running task belongs to the enclaved container; and in response to determining that the running task belongs to the enclaved container, making active the second nested page table so that the task can access a memory state of the second nested page table. In some of these embodiments, the method further comprises copying system call arguments from a syscall buffer of the enclaved container to a syscall buffer of the untrusted OS. In some of these embodiments, the method still further comprises copying modified system call arguments from the syscall buffer of the untrusted OS to the syscall buffer of the enclaved container.

DETAILED DESCRIPTION

In accordance with some embodiments, mechanisms (which can include systems, methods, and non-transitory computer readable media) for protecting applications from untrusted operating systems are provided.

In some embodiments, a container architecture is provided that protects application data confidentiality and integrity without the need to trust an operating system (OS). An application running under this container architecture may be described herein as running in a container under the architecture in some embodiments.

In some embodiments, this container architecture includes a mechanism that leverages existing hardware features to enforce container security guarantees in a trusted computing base (TCB). This mechanism is referred to herein as a container security monitor (CSM).

In some embodiments, the container architecture enclaves traditional containers (e.g., LINUX containers) to protect the confidentiality and integrity of container code and data. A container can be referred to herein as being enclaved if the container architecture protects it from the OS, in some embodiments.

From an application's perspective, using enclaved containers is similar to using traditional containers, in some embodiments. Applications do not need to be modified to use enclaved containers and can make use of OS services via system calls, in some embodiments. For example, in some embodiments, container management solutions, such as DOCKER, can be used to manage enclaved containers. In some embodiments, the container architecture can support commodity OSes, though minor OS modifications may be needed to use the container architecture's enclave mechanism.

In some embodiments, the CSM protects the confidentiality and integrity of container code and data when in use. In some embodiments, it achieves this by performing two main functions: (1) access control; and (2) validating OS operations. In some embodiments, interrupts are delivered directly to the OS and devices are directly managed by the OS's existing drivers. In some embodiments, the CSM relies on the OS for much of the complex functionality required to manage hardware resources, including bootstrapping, CPU scheduling, memory management, file systems, and interrupt and device management.

In some embodiments, the CSM, the OS, and the containers can operate at different privilege levels so that the CSM can control the activities of the OS and the containers. For example, in some embodiments, the container architecture can be implemented on ARM hardware and use different ARM privilege levels (e.g., EL0, EL1, and EL2) for the CSM, the OS, and the containers. While specific privilege levels (e.g., EL0, EL1, and EL2) of specific hardware (e.g., ARM hardware) are described herein, any suitable privilege levels on any suitable hardware can be used in some embodiments.

Figure 1:
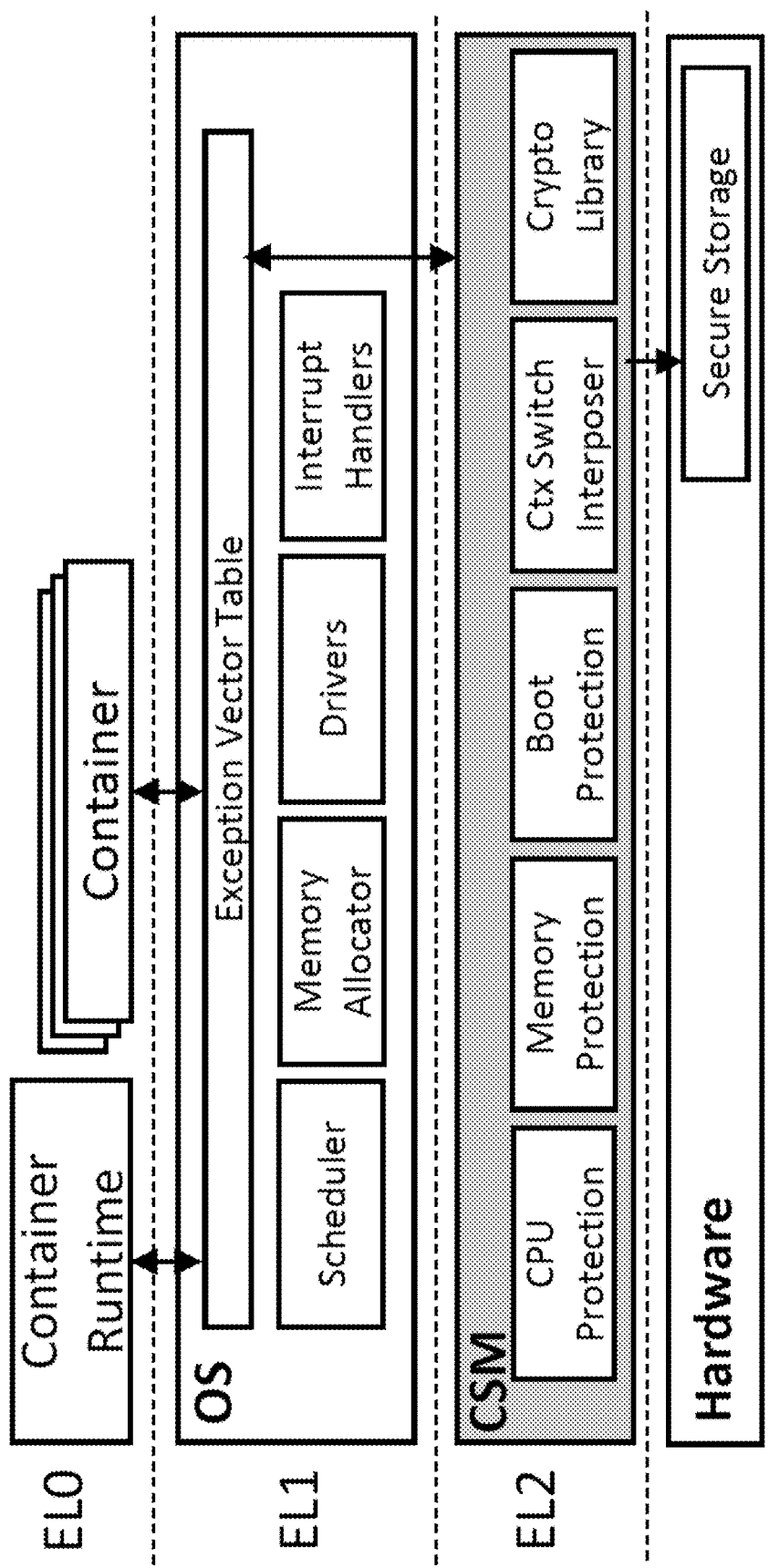
FIG. 1 is an example of a block diagram showing privilege levels of different components of a system in accordance with embodiment some embodiments.

Turning to FIG. 1, in accordance with some embodiments, an example block diagram showing privilege levels of different components of a system including the container architecture described herein is illustrated. As shown, a CSM operates at privilege level EL2 and includes CPU protection, memory protection, boot protection, a context switch interposer, and a cryptography library, in some embodiments. The OS operates at privilege level EL1 and includes an exception vector table, a scheduler, a memory allocator, drivers, and interrupt handlers, in some embodiments. A container runtime and containers operate at privilege level EL0, in some embodiments. And, as also shown in FIG. 1, hardware includes secure storage, in some embodiments.

In some embodiments, to enclave containers, the CSM introduces the notion of a physical address space (PAS), which PAS is an isolated set of physical memory pages accessible only to the assigned owner of the PAS. Each page of physical memory is mapped to at most one PAS in some embodiments.

In some embodiments, when the container architecture is implemented on ARM hardware, ARM's EL2 privilege level and nested paging can be used to enforce PASes. ARM EL2 has its own hardware system state. This minimizes the cost of trapping to the CSM running in EL2 when calling and returning from system calls because system state does not have to be saved and restored on each trap, in some embodiments.

In some embodiments, the CSM uses PASes to provide memory access control by assigning a separate PAS to each enclaved container, thereby isolating the physical memory of each container from the OS and any other container. The OS and containers cannot access the memory of a PAS not assigned to them, in some embodiments. In some embodiments, memory not assigned to any PAS or the CSM, is accessible to the OS. The CSM can access memory in any PAS, in some embodiments. Within a PAS, addresses for accessing memory are the same as the physical addresses on the machine, in some embodiments. In some embodiments, physical memory cannot be remapped to a different address in a PAS. For example, in some embodiments, if page number 5 of physical memory is assigned to a PAS, it will be accessed as page number 5 from within the PAS. In some embodiments, a container's private data in memory only resides on pages mapped to its own PAS, therefore its confidentiality and integrity is protected from the OS and other containers.

In some embodiments, the CSM repurposes existing hardware virtualization support to run at a higher privilege level and create one or more PASes, but is itself not a hypervisor and does not do any virtualization. Instead, the OS continues to access devices directly and remains responsible for allocating resources in some embodiments. In some embodiments, by supporting containers directly without virtualization, no additional guest OS or complex runtime needs to run within the secured execution environment.

In some embodiments, the CSM interposes on some or all transitions between containers and the OS, namely system calls, interrupts, and exceptions. In this way, the CSM can ensure that container processes and threads (which are collectively referred to herein as tasks) can only access a container's PAS when executing within the container. The CSM ensures that when a task traps to the OS and switches to running OS code, the task no longer has access to a container's PAS, in some embodiments.

In some embodiments, the only time in which any container data in memory is made available to the OS is as system call arguments, which only the CSM can provide by copying the arguments between container PASes and the OS.

In some embodiments, the CSM is aware of system call semantics and encrypts system call arguments as needed before passing them to the OS, such as for inter-process communication between processes, protecting container private data in system call arguments from the OS. In some embodiments, the CSM relies on applications to encrypt their own I/O data. In some embodiments, secure key storage, such as provided by a Trusted Platform Module (TPM), can be used in conjunction with the container architecture. In some embodiments, containers can use end-to-end encrypted channels to protect their I/O data.

In some embodiments, once a system call completes and before allowing a process to return to its container, the CSM checks the CPU state to authenticate the process before switching the CPU back to using the container's PAS.

In some embodiments, the CSM maintains an array with information for all tasks running in enclaved containers, which array can be referred to herein as an enclaved task array. In some embodiments, when entering the OS, the CSM checks if the calling task is in an enclaved container, in which case the CSM saves to the enclaved task array the CPU registers and the cause of the trap, switches out of the container's PAS, and clears any CPU registers not needed by the OS. In some embodiments, when exiting the OS, the CSM checks if the running task belongs to an enclaved container and validates that the stack pointer and page table base register match what was saved in the enclaved task array for the respective task, in which case the CSM switches to the respective container's PAS so the task can access its enclaved CPU and memory state. As a result, container private data in CPU registers or memory is not accessible to the OS, in some embodiments.

In addition to ensuring a container's CPU and memory state is not accessible outside the container, the container architecture protects against malicious code running inside containers, in some embodiments. In some embodiments, only trusted binaries, which may be signed and encrypted in some embodiments, can run in containers. In some embodiments, the CSM is required to decrypt the binaries, so they can only run within containers with supervision by the CSM. In some embodiments, the CSM authenticates the binaries before they can run, so untrusted binaries cannot run in the containers.

In some embodiments, the container architecture also guards against memory-related Iago attacks that could induce arbitrary code execution in a process in a container by preventing virtual or physical memory allocations that could overwrite a process' stack.

In some embodiments, to allow the OS to provide functionality that traditionally requires access to a task's CPU state and memory, the CSM provides an application binary interface (ABI) that allows the OS and/or container runtime(s) to request services from the CSM. An example of a CSM's ABI's commands in some embodiments is shown in the following table:

| Example ABI Command Name | Example ABI Command Function |
|---|---|
| create_enclave | Create new enclave for a container |
| destroy_enclave | Destroy enclave of a container |
| protect_vectors | Verify OS exception vectors |
| alloc_iopgtable | Allocate I/O device page table |
| free_iopgtable | Free I/O device page table |
| set_ioaddr | Map I/O virtual address to physical address |
| clear_ioaddr | Unmap I/O virtual address |
| get_ioaddr | Get physical address for I/O virtual address |
| enter_os | Context switch CPU to OS |
| exit_os | Context switch CPU from OS |
| set_pt | Update page table entry of a process/thread |
| copy_page | Copy contents of a page to a container |
| flush_tlb | Flush TLB entries for a container |
| task_clone | Run new process/thread in a container |
| task_exec | Run in new address space in a container |
| task_exit | Exit a process or thread in a container |
| futex_read | Read the value of a futex in a container |

It should be understood that the example ABI command names provided in the table above and/or used elsewhere herein are just examples and that any other suitable names can be used for the functions described as being performed in response to the corresponding ABI command.

In some embodiments, create_enclave and destroy_enclave commands can be used by a container runtime, such as runC, to enclave and unenclave containers, respectively. In some embodiments, enclaving a container includes assigning the container to its own PAS. In some embodiments, other calls can be used by an OS to interact with the CSM as described below.

In some embodiments, the container architecture boots the CSM by relying on Unified Extensible Firmware Interface (UEFI) firmware and its signing infrastructure with a hardware root of trust.

The CSM and OS kernel are linked as a single binary which is cryptographically signed, in some embodiments. This signing may be performed by any suitable authority, such as a cloud provider running one or more containers as described herein, in some embodiments.

In some embodiments, the binary is first verified using keys already stored in secure storage, ensuring that only the signed binary can be loaded.

Next, in some embodiments, the OS's bootstrapping code is used to install the CSM securely at boot time since the OS is assumed to be initially benign. In some embodiments, at boot time, the OS initially has full control of the system to initialize hardware and installs the CSM. In some embodiments, CSM installation occurs before local storage, network, and serial input services are available, so remote attackers cannot compromise the CSM's installation.

Then, in some embodiments, after its installation, the CSM runs at a higher privilege level than the OS (e.g., the CSM at EL2 and the OS at EL1) and subsequently enables PASes as needed. In some embodiments, physical memory is statically partitioned between the CSM and the OS, most of which physical memory is assigned to the OS. In some embodiments, any attempt to access the CSM's memory except by the CSM will trap to the CSM and be rejected.

In some embodiments, the CSM expects the hardware to include an input-output memory management unit (IOMMU) to protect against DMA attacks by devices managed by the OS. In some embodiments, the CSM retains control of the IOMMU and requires the OS to make CSM calls to update IOMMU page table mappings, which are configured by the OS during boot. This ensures that I/O devices can only access memory mapped into the IOMMU page tables managed by the CSM, in some embodiments. In some embodiments, the OS calls alloc_iopgtable during boot to allocate an IOMMU translation unit and its associated page table for a device, and calls set_ioaddr to assign physical memory to the device to use for DMA. In some embodiments, the CSM ensures that the OS can only assign its own physical memory to the IOMMU page tables, ensuring that DMA attacks cannot be used to compromise CSM or container memory.

In some embodiments, to securely initialize an enclaved container, an image that is to be used for the container is processed into a container image. In some embodiments, a tool (e.g., a command line tool) takes an image (e.g., a DOCKER image), finds all executable binary files contained within the image, and encrypts the sections containing the code and data used by the code using any suitable key (e.g., such as a public key paired with a trusted private key stored in the secure storage of the host and accessible only by the CSM). The binaries are therefore protected from being seen or run unless decrypted, in some embodiments. In some embodiments, these encrypted sections are then hashed (using any suitable hashing method) and their hash values recorded along with the binaries that they belong to. In some embodiments, these values are then signed with the private key of the container image's creator (or any other suitable authority) whose paired public key is accessible in the secure storage of the host to ensure authenticity and bundled with the container image for later reference during process creation.

In some embodiments, to start a container using a container image of the container architecture, the container's runtime is modified to execute a shim process in place of the container's specified init process. The container's runtime passes the shim the path of the init process within the container along with any arguments and its environment, in some embodiments. Additionally, in some embodiments, the shim is given the signed binary hash information bundled with the container image. In some embodiments, the shim process runs a statically linked program that calls the create_enclave CSM call before executing the original init process, passing the signed hash information to the CSM as part of the call.

In some embodiments, a create_enclave function creates a new enclave using the container image and returns with the calling process running in the enclaved container. In some embodiments, the return value of the call is the new enclave's identifier. In some embodiments, create_enclave performs the following steps. First, it creates a new PAS for the container. Second, it finds the physical pages corresponding to the calling process' page tables, marks them read-only to prevent the OS from changing the page tables directly. Third, it moves the user-space memory of the calling process to the container by searching the user-space portion of the calling process' page table to find each of its pages of physical memory and moving each of them into the container's PAS so that they are no longer accessible by the OS. Finally, it checks the contents of the loaded shim binary in memory against a known hash to verify the calling process is the expected shim process.

After returning from create_enclave, the shim executes the container's init process from within the container, in some embodiments. In some embodiments, since the container's init process obtains its executable from the container image whose code and data are encrypted, the OS may load the code in the container image, but the OS cannot actually execute the code in the container image without the CSM using its private key to decrypt the code in the container image. In some embodiments, because the CSM itself is securely booted and enclave code is encrypted and only runnable by the CSM, an unbroken chain of trust is established enabling remote attestation.

In some embodiments, the container runtime calls destroy_enclave to remove the enclave of a container, which terminates all running processes and threads within the container to ensure that any container CPU state and memory is cleared and no longer accessible to the OS or any other container before removing the enclave. Thus, the container is effectively returned to the same state it was in before create_enclave was called, in some embodiments.

In some embodiments, the container architecture described herein protects a container's memory at the application level by preventing the OS from directly updating per process page tables. This can be useful to protect against Iago attacks, in some embodiments.

In some embodiments, the container architecture marks the physical memory backing the per process page tables as read-only to the OS, requiring the OS to make requests to the CSM to update process page tables on the OS's behalf and allowing the CSM to reject updates if the OS behaves incorrectly.

Figure 2:
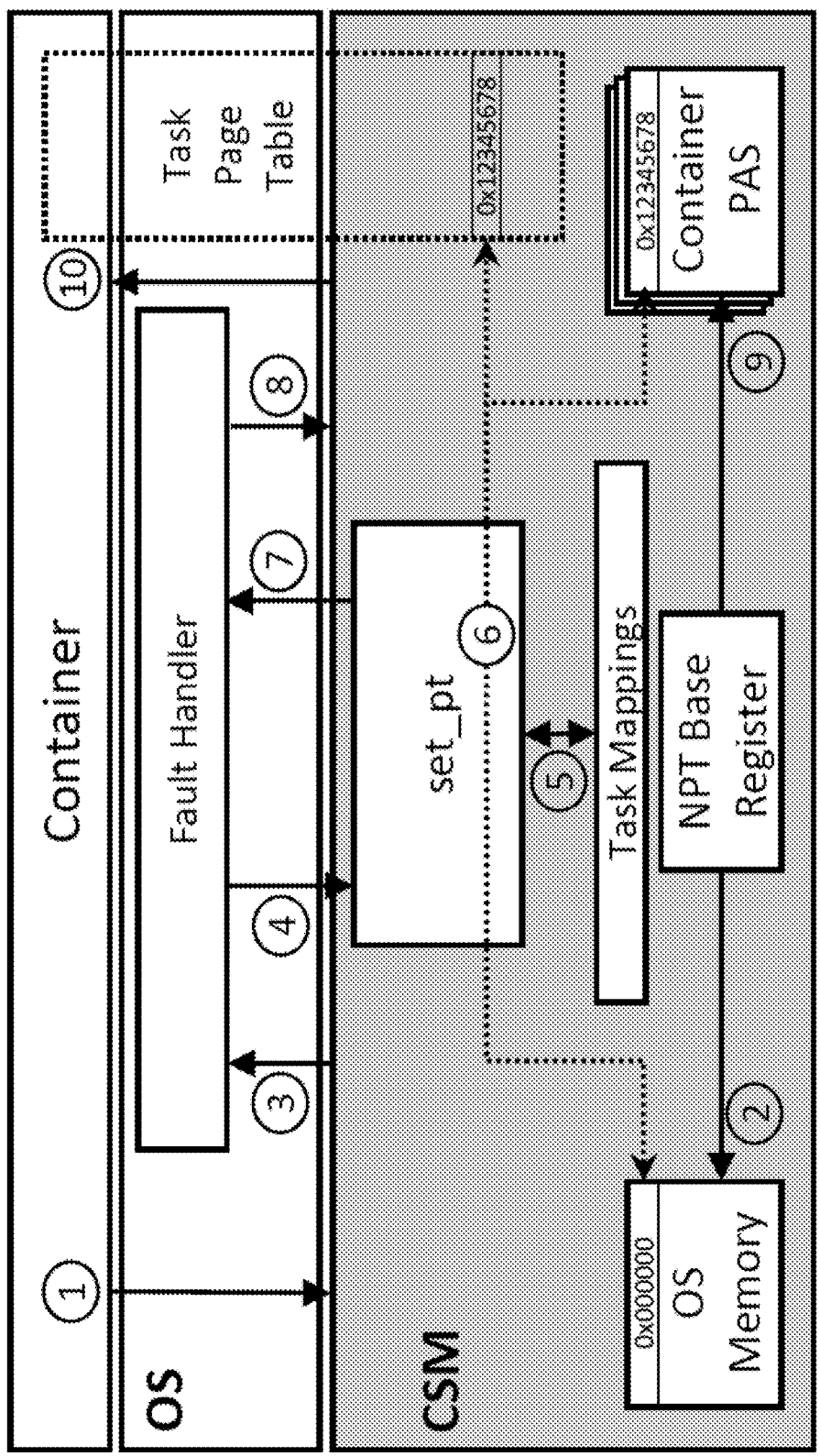
FIG. 2 is an example of a flow diagram for a process for updating a container's page table in accordance with embodiment some embodiments.

Turning to FIG. 2, an example of a process for updating a container's page table during a page fault in accordance with some embodiments is shown. As illustrated, when a process in a container faults on a page, an exception causes control to transfer to the OS by way of the CSM (step 1-3). The OS then allocates a page having a virtual address for the process and attempts to update the process page table, but is unable to do so directly. Instead, it performs a set_pt CSM call (step 4). Upon receiving the set_pt call, the CSM verifies if the allocation is acceptable (step 6). To do so, the CSM maintains a list of valid mappings for each process. This list is maintained by interposing on system calls that adjust memory mappings. In LINUX, for example, these calls include mmap and brk, in some embodiments. Prior to writing the page table entry, the CSM first verifies that the virtual address specified belongs to a valid mapping. If it does not, the update is rejected. Next, the CSM checks if the physical page assigned is already in the container's PAS and therefore already in use. This can commonly occur innocuously when two processes in a container have the same file mapped in their address spaces, for example. However, to prevent the risk of overwriting existing memory via a physical memory-based Iago attack, the CSM marks any physical page mapped more than once read-only in the container's PAS if it was not inherited from a parent as part of process creation. While this is effective at preventing these attacks, the downside is that writes to such memory will trap and need to be handled by the container architecture described here. In some embodiments, the container architecture described herein disallows writable memory-mapped file I/O. Finally, if the virtual address is valid and not mapped to an existing physical page in a container's PAS, the CSM unmaps the assigned physical page from the OS and maps it into the container's PAS. The CSM then updates the page table entry on the OS's behalf. Control is then returned back to the OS (step 7). When returning control back to the process that faulted, the process's container PAS will be switched to (steps 8-10).

For copy-on-write (CoW) memory, an OS traditionally expects to be able to share a page in memory among multiple processes and, when a write is attempted by a process, break the CoW by copying the contents of the page to a new page assigned to the process.

Because the OS does not have the ability to copy container memory in some embodiments of the container architecture, the OS is modified to make a copy_page CSM call to have the CSM perform the CoW break on its behalf in some of these embodiments. In some embodiments, in doing so, the CSM will verify the source page belongs to the container's PAS and the destination page belongs to the OS's PAS. If so, it will remove the destination page from the OS's PAS, put it into the container's PAS, and perform the copy, in some embodiments.

In some embodiments, the container architecture supports running applications: returning memory to the OS as processes adjust their heap; unmapping memory regions; and exiting. In some embodiments, the container architecture described herein supports this while preserving the privacy and integrity of a container's memory. In some embodiments, as with memory allocation, system calls that can allow for returning of an application's memory, like munmap and _exit, are tracked to maintain an accurate view of a container's memory mappings. In some embodiments, during these calls, the OS may attempt to free pages allocated to the process. In doing so, as with memory allocation, the OS makes use of the set_pt CSM call since it cannot update the page table directly, in some embodiments. In some embodiments, the CSM will then verify if the application has made a call to release the specified memory and reject the update if it has not. If the update is valid, the CSM will perform the page table update, and if no longer needed, scrub the page and remove it from the container's PAS, in some embodiments.

In some embodiments, while the container architecture described herein ensures that container memory is not accessible to the OS, many OS interactions via system calls expect to use memory buffers that are part of an application's memory to send data to, or receive data from, the OS.

To support these system calls, in some embodiments, the container architecture provides a region of memory accessible to the OS for copying system call arguments (which is referred to herein as a syscall buffer) for each task whose virtual addresses are mapped into the task's address space and backed by physical memory outside the container's PAS enabling the OS to access syscall arguments.

In some embodiments, when interposing on a system call exception, the CSM replaces references to memory buffers passed in as system call arguments with those to the task's syscall buffer. For buffers that are used to send data to the OS, the data in those buffers is copied to the syscall buffer as well, in some embodiments. When returning to the container, the references to the syscall buffer are replaced with those to the original memory buffers, in some embodiments. For buffers that are used to receive data from the OS, the data in the syscall buffer is copied to the original memory buffers as well, in some embodiments.

In some embodiments, most system calls are interposed on by a single generic wrapper function in the CSM that uses a table of system call metadata to determine which arguments must be altered. System calls with more complex arguments, like those involving iovec structures are interposed on with more specific wrapper functions, in some embodiments.

In some embodiments, to support PASes with hardware virtualization extensions, the CSM is run at a privilege level sufficiently high so that it is more privileged than the OS and is able to control nested page tables (NPTs) (e.g., ARM's STAGE 2 PAGE TABLES and INTEL'S EXTENDED PAGE TABLES (EPT)). On ARM, this level is EL2, in some embodiments. In some embodiments, the CSM uses NPTs to support PASes. In some embodiments, each PAS has its own NPT, isolating the physical memory of each container from the OS and from other containers. The CSM switches a CPU from one PAS to another PAS by updating the CPU's NPT base register to point to the other PAS's NPT, in some embodiments. Similarly, in some embodiments, the CSM uses NPTs to protect its own memory from the OS and containers by not mapping its own memory into the NPTs. The memory for the NPTs is part of the CSM's protected memory and is itself not mapped into any NPTs so that only the CSM can update the NPTs, in some embodiments. When the CSM runs in EL2, NPTs are disabled, so it has full access to physical memory, in some embodiments.

In some embodiments, except for the CSM's physical memory, all physical memory is initially assigned to the OS and mapped to its NPT. In some embodiments, when the OS allocates physical memory to a process in a container, the CSM unmaps the physical memory from the OS's NPT and maps the physical memory to the respective container's NPT at the same address. The CSM checks the OS's NPT to make sure that the OS has the right to allocate a given page of memory, in some embodiments. For example, in some embodiments, should the OS attempt to allocate a physical page belonging to the CSM, the CSM will reject the allocation and not update the OS's NPT or container's NPT. In some embodiments, the CSM also checks that any page allocation proposed by the OS for a container is not mapped into the IOMMU page tables and will therefore not be subject to DMA attacks, as discussed above.

One complication of supporting PASes with virtualization hardware is that ordinarily, after updating a page table entry, the OS will need to update the translation lookaside buffer (TLB) to flush invalid entries. However, because the container architecture described herein makes use of nested paging for container memory, the underlying hardware will not flush entries related to NPTs not belonging to the OS. To remedy this, the OS is modified to make flush_tlb CSM calls, in some embodiments. During this call, the CSM switches to the respective container's NPT and issues the TLB flush instruction(s) on the OS's behalf before switching back to the OS's NPT and returning.

As described above, in some embodiments, the CSM interposes on some or all system calls, interrupts, and exceptions. In some embodiments, in order to implement this, the container architecture modifies the OS's exception vector table for handling system calls, interrupts, and exceptions so that enter_os and exit_os CSM calls are always made before and after the actual OS event handler is performed. The CSM then prevents the OS from tampering with the modified vector table by marking its backing physical memory read only in the OS's NPT, in some embodiments.

Figure 3:
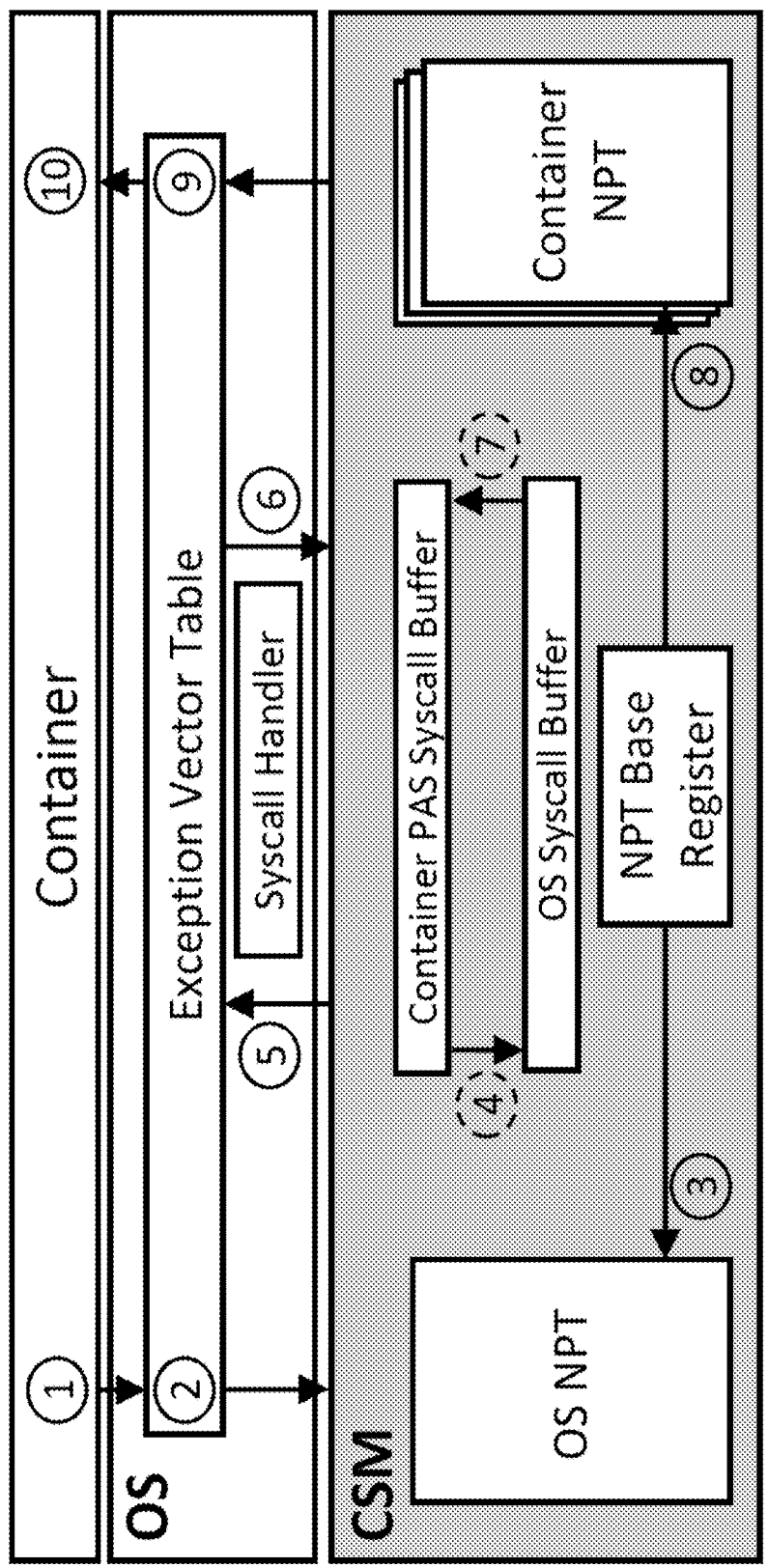
FIG. 3 is an example of a flow diagram for a process involved in interposing on transitions between the containers and OS in accordance with embodiment some embodiments.

FIG. 3 depicts an example of a process involved in interposing on transitions between the containers and OS when repurposing virtualization hardware, in accordance with embodiment some embodiments. As shown, while a process is running in a container, an exception occurs transferring control to the protected OS exception vector table (step 1). All entry points in the exception vector table invoke the enter_os CSM call (step 2). During this call, the CSM makes the OS's NPT active (step 3). The OS will therefore not be able to access private physical memory mapped into container NPTs. The system call arguments (if any) are then copied from the container PAS syscall buffer to the OS syscall buffer (step 4). Control is transferred back to the OS (step 5) to perform the required exception handling. When the OS has finished handling the exception, the exit_os CSM call is made as part of the return path of the exception vectors when returning to userspace (step 6). On exit_os, the CSM verifies the exception return address to ensure that the call is from the trusted exception vectors, which the OS cannot change, rejecting any that are not. Modified system call arguments (if any) are then copied from the OS syscall buffer to the container PAS syscall buffer (step 7). The CSM then checks if the running task belongs to an enclaved container, in which case the CSM makes the respective container's NPT active so the task can access its PAS memory state (step 8). Control is restored to the container by returning from exit_os (step 9) and back to userspace (step 10). If exit_os is not called, the CSM will not switch the CPU to use the container's PAS, so its state will remain inaccessible on that CPU.

ARM CONFIDENTIAL COMPUTE ARCHITECTURE's (ACCA's) concept of REALMS offers an alternative solution to providing PASes and supporting the CSM, in accordance with embodiment some embodiments. With ACCA, REALMS can be supported by a separate REALM WORLD alongside ARM's existing secure and non-secure worlds complete with ARM's existing three privilege levels, EL0-3. As with an existing secure world, a REALM WORLD has access to both its own memory and the memory within the non-secure world. REALMS are managed using the REALM MANAGEMENT MONITOR (RMM) running in EL2 within the REALM WORLD giving it full access to REALM memory and CPU state as well as control over their execution. REALM execution and memory delegation is provided to the other worlds through the REALM MANAGEMENT INTERFACE (RMI).

In some embodiments, REALMS, the RMM, and REALM WORLD can be used to implement the container architecture described herein using ACCA as an alternative to repurposing virtualization hardware. ACCA provides dynamically adjustable protected memory, enabling PASes to be implemented as REALMS instead of separate NPTs, in some embodiments. The functionality of the CSM can be integrated with the RMM and the RMI extended to encompass the CSM's API, in some embodiments.

In some embodiments, the container architecture described herein supports the full lifecycle of processes and threads enclaved in containers, including their dynamic creation and termination via standard system calls such as fork, clone, exec, and exit. In some embodiments, the container architecture described herein needs to track process address spaces, so it can track updates to process page tables as described above, including the creation of new process address spaces on fork and exec. In some embodiments, the container architecture described herein also needs to track which processes or threads are allowed to run in which containers. In some embodiments, this is achieved by requiring the OS to call a set of CSM calls: task_clone on fork and clone; task_exec on exec; and task_exit on exit. If the OS does not make the respective CSM call, the created task and executed binary will simply not run in its enclave and therefore will not have access to its data.

In some embodiments, these calls are used to update the enclaved task array described above. In some embodiments, each entry in the array includes the enclave identifier of the container in which the task executes and the address of the page table used by the task, which is write protected and cannot be changed by the OS directly. In some embodiments, the CSM uses the array index as the identifier for an enclaved task.

On fork, a calling task will create a child task that is a copy of itself, including having a copy of its address space. In some embodiments, assuming that a calling task is enclaved in a container, the OS is configured to call task_clone with the enclaved task identifier of the calling task and a flag indicating that a new address space is being created. In some embodiments, when task_clone is called, the CSM confirms that the calling task issued a fork system call, marks the child's page table read-only to the OS, and checks that the child's newly created address space is a clone of the caller's. If all checks pass, the CSM creates a new entry in the enclaved task array with the same enclave identifier as the calling process, and returns the array index of the new entry as the identifier for the task. When the OS runs the child and the task returns from the OS, the OS provides the CSM with the enclaved task's identifier. The CSM then looks up the task in the enclaved task array using this identifier and confirms that the address of the page table stored in the entry matches the address stored in the page table base register of the CPU. If the checks pass, the CSM then restores the CPU state and switches the CPU to the container's PAS thereby allowing the task to resume execution in the container. If the OS does not call task_clone, then upon exiting the OS, the task's PAS would not be installed and it would fail to run.

On clone, a calling task will create a child task that runs in the same address space as the caller. In some embodiments, the behavior is similar to fork, except that task_clone is passed a flag indicating that the task is using the address space of the caller, so there is no need to check the contents of the child's page table. The newly created entry in the global enclaved task array will have the same page table address as the caller's entry, in some embodiments.

On exec, a calling task will replace its existing address space with a new one. In some embodiments, the OS calls task_exec to replace a task's existing address space with a new one. In some embodiments, task_exec which works similarly to task_clone for fork in that a new enclaved task entry with a new address space is created. The difference is that the new address space is validated by ensuring that the new process' stack is set up as expected and the executable binary is signed and in the container image. After creating the new enclaved task entry, the original address space is disassociated from the container, scrubbing any memory that is to be returned to the OS and removing such memory from the container's PAS.

On exit, in some embodiments, the OS will call task_exit so the CSM can remove the enclaved task entry from the enclaved task array. If an address space has no more tasks in the container, the CSM disassociates it in a similar manner to the exec case, in some embodiments.

In accordance with some embodiments, the container architecture described herein supports a broad array of inter-process mechanisms for applications running in container enclaves, including protected IPC communication.

Since the container architecture described herein does not trust the OS, it encrypts and protects this communication, in some embodiments. To achieve this, in some embodiments, the container architecture described herein leverages the system call interposition performed by the CSM. System calls that can create IPC-related file descriptors, such as pipe and Unix Domain Sockets, are interposed on and their returned file descriptors (FDs) are recorded in per-process arrays that mark them as related to IPC, in some embodiments. When the CSM interposes on a task's system call that passes data through FDs, like write and sendmsg, the CSM checks if the given FD is one related to IPC for the process making the system call, in some embodiments. If it is, the CSM first uses authenticated encryption with a randomly generated symmetric key created during container initialization (or any other suitable key, in some embodiments) to encrypt the data before moving it into the task's syscall buffer, in some embodiments. In some embodiments, a record counter, incremented on each transaction, is included as additional authenticated data to prevent the host from replaying previous transactions.

Similarly, in some embodiments, data is decrypted and authenticated when interposing on system calls like read and recvmsg before copying it to the calling process's PAS.

As mentioned above, in some embodiments, to avoid trusting the OS's memory allocations, memory pages that are used by more than one process in a container are marked read-only in the container's PAS unless the pages are known to belong to a shared memory mapping and are inherited during process creation. Due to this, in some embodiments, the container architecture described herein does not allow for writable IPC shared memory through the use of methods, such as shmget and shm_open, wherein the OS is responsible for mapping pages belonging to one enclaved process into another enclaved process' memory. However, in some embodiments, shared memory regions created by a parent process through, for example, mmap with MAP_SHARED, and faulted in prior to forking, can be written to by both the parent process and its child process since the child's address space is verified after the fork call, as discussed above.

Futexes are used among threads and processes to synchronize access to shared regions of memory. As part of the design of futex, the OS is traditionally required to read the futex value, which is in a process' address space and included in a corresponding container's memory. This direct access to container memory is incompatible with the memory isolation provided by the container architecture.

In accordance with some embodiments, to support futex, the OS is modified such that it makes a futex read CSM call to obtain the value of a futex for container processes. The CSM ensures that only the futex address passed to futex can be read, and only if a futex call has been made, in some embodiments.

Signals, used to notify processes of various events, present two issues for the container architecture described herein. First, traditionally when delivering a signal to a process, a temporary stack for the signal handler is set up in the process' memory. With enclaved containers, this memory is not accessible to the OS, in some embodiments. To remedy this, in some embodiments, the OS is modified to setup this stack in a region of memory outside of the container's PAS, which is then moved to the PAS when the signal handler is executed and returned to the OS when the signal handler returns via rt_sigreturn (for example). Second, in some embodiments, the OS has to adjust the control flow of the process to execute the signal handler instead of returning to where it was previously executing. The container architecture described herein cannot allow the OS to adjust the control flow of an enclaved process without validating it is doing so properly. To achieve this, in some embodiments, as part of the CSM interposing on system calls, it tracks signal handler installation via system calls such as rt_sigaction (for example). Upon handling a signal, the CSM ensures that the process will be correctly returning to a registered handler.

Traditionally, files within a container can only be accessed through an OS's I/O facilities making access to a container's files inherently untrustworthy without additional protection. Applications may use encryption to fully protect sensitive data files within a container, but the executable binaries cannot be fully encrypted as it is the OS's responsibility to load them for execution.

As discussed above, in some embodiments, container images for the container architecture described herein are pre-processed. For example, in some embodiments, certain binaries (such as ELF binaries, which are widely-used on Linux) have .text, .data, and .rodata sections (and/or any other suitable sections) that contain executable code and data used by the code are combined into various segments when loaded into memory. In some embodiments, the headers of these binaries can be left unencrypted, but the .text, .data, and .rodata sections can be encrypted and then hashed, and their hash values recorded along with the binaries. This enables the container architecture described herein to validate the integrity and authenticity of executable binaries, in some embodiments.

In some embodiments, a binary, such as an ELF binary, is executed by the OS as a result of a process calling exec, upon which the OS loads the binary by mapping its headers into memory, reading the headers to determine how to process the rest of the binary, and then mapping the segments of the binary to memory. As discussed above, in some embodiments, the OS is required to call task_exec, which passes the virtual addresses of the binary's loaded segments containing the .text, .data, and .rodata sections (and/or any other suitable sections) to the CSM, in some embodiments. During this call, in some embodiments, the CSM moves the process' pages, corresponding to the loaded binary, into the container's PAS, validates that the hashes of the encrypted .text, .data, and .rodata sections (and/or any other suitable sections) match the hashes for the given binary from the container image to confirm the authenticity and integrity of the loaded segments, and then decrypts the sections in memory. In some embodiments, the virtual to physical address mappings of these binary segments are recorded for later use. Upon returning from task_exec, the OS will begin running the task whose binary is now decrypted within protected container memory, in some embodiments. If checking the hashes or decryption fails, the CSM will refuse to run the binary within an enclaved container, ensuring only trusted binaries can be run within an enclaved container, in some embodiments.

In some embodiments, for dynamically linked binaries, in addition to the binary segments the OS maps during exec, the OS also maps the segments of the loader in the process' address space. These segments are verified by the container architecture described herein in the same manner as the binary's segments, in some embodiments. Dynamically linked binaries load and execute external libraries that must be verified to be as expected and trusted, in some embodiments. During the container image creation process, as with executable binaries, library binaries are also encrypted preventing their use without the CSM, in some embodiments. In some embodiments, these libraries are loaded and linked at runtime in userspace by a loader that is part of the trusted container image. To do this, the loader, running as part of a process' address space, mmaps library segments into memory, in some embodiments. The CSM intercepts these mmaps by interposing on FD-related system calls, such as open, in some embodiments. If an FD is created for one of the libraries within a container, as recorded during container image creation, the CSM marks that FD as associated with the given library, in some embodiments. If this FD is then used with mmap, the CSM intercepts it, in some embodiments. Based on the size of the mmap request and the protection flags used, the CSM can infer which segment the loader is mapping, in some embodiments. If it is a segment containing one of the encrypted sections, the CSM performs the same hashing, decryption, and memory map recording as it does with executable binaries, in some embodiments.

Figure 4:
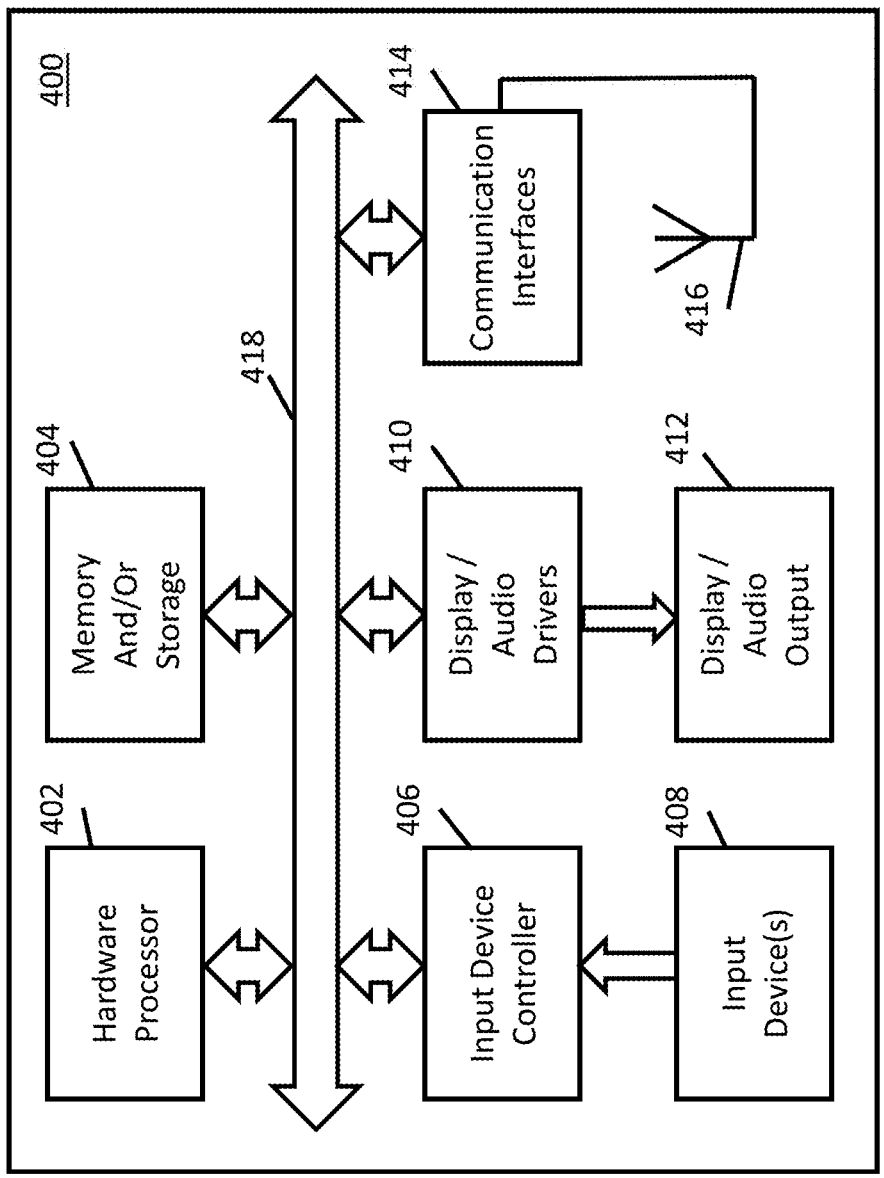
FIG. 4 is an example of a block diagram of hardware that can be used in accordance with embodiment some embodiments.

In accordance with embodiment some embodiments, the container architecture can be implemented on any suitable hardware in some embodiments. For example, in some embodiments, the container architecture can be implemented on any suitable general purpose computer or special purpose computer. For example, a mobile phone may be implemented using a special purpose computer. Any such general purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general purpose computer or a special purpose computer in some embodiments.

Memory and/or storage 404 can be any suitable memory and/or storage for storing programs, data, media content, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks. For example, interface(s) 414 can include network interface card circuitry, wireless communication circuitry, and/or any other suitable type of communication network circuitry.

Antenna 416 can be any suitable one or more antennas for wirelessly communicating with a communication network in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, at least some of the above-described steps of the processes of FIGS. 2 and 3 can be executed or performed in any order or sequence not limited to the order and sequence shown in and described in connection with the figures. Also, some of the above blocks of FIGS. 2 and 3 can be executed or performed substantially simultaneously where appropriate or in parallel to reduce latency and processing times. Additionally or alternatively, some of the above described blocks of the processes of FIGS. 2 and 3 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, systems, methods, and media for protecting applications from untrusted operating systems provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for protecting an application from an untrusted operating system (OS), comprising:
    memory; and
    a hardware processor coupled to the memory and configured to:
        determine that a virtual address for a page of memory allocated by the untrusted OS for the application belongs to a valid mapping;
        determine that the page of memory is not already in use; and
        in response to determining that the virtual address for the page of memory belongs to a valid mapping and determining that the page of memory is not already in use, map the page of memory to an enclaved container for the application;
        make active a first nested page table of the untrusted OS such that the untrusted OS is unable to access private physical memory mapped into a second nested page table of the enclaved container for the application; and
        while the first nested page table is active:
            transfer CPU control to the untrusted OS so that the untrusted OS can perform exception handling for the application;
            verify that an exception return address corresponds to a trusted exception vector;
            determine that a running task belongs to the enclaved container; and
            in response to determining that the running task belongs to the enclaved container, make active the second nested page table so that the task can access a memory state of the second nested page table.

2. The system of claim 1, wherein the hardware processor is further configured to unmap the page of memory from the untrusted OS.

3. The system of claim 1, wherein determining that the virtual address for the page of memory belongs to a valid mapping is based on a list of valid mappings for the application.

4. The system of claim 3, wherein the list of valid mappings is built by interposing on system calls that adjust memory mappings.

5. The system of claim 1, wherein the hardware processor is further configured to copy system call arguments from a syscall buffer of the enclaved container to a syscall buffer of the untrusted OS.

6. The system of claim 5 wherein the hardware processor is further configured to copy modified system call arguments from the syscall buffer of the untrusted OS to the syscall buffer of the enclaved container.

7. A method for protecting an application from an untrusted operating system (OS), comprising:
    determining that a virtual address for a page of memory allocated by the untrusted OS for the application belongs to a valid mapping;
    determining that the page of memory is not already in use; and
    in response to determining that the virtual address for the page of memory belongs to a valid mapping and determining that the page of memory is not already in use, mapping the page of memory to an enclaved container for the application;
    making active a first nested page table of the untrusted OS such that the untrusted OS is unable to access private physical memory mapped into a second nested page table of the enclaved container for the application; and
    while the first nested page table is active:
        transferring CPU control to the untrusted OS so that the untrusted OS can perform exception handling for the application;
        verifying that an exception return address corresponds to a trusted exception vector;
        determining that a running task belongs to the enclaved container; and
        in response to determining that the running task belongs to the enclaved container, making active the second nested page table so that the task can access a memory state of the second nested page table.

8. The method of claim 7, further comprising unmapping the page of memory from the untrusted OS.

9. The method of claim 7, wherein determining that the virtual address for the page of memory belongs to a valid mapping is based on a list of valid mappings for the application.

10. The method of claim 9, wherein the list of valid mappings is built by interposing on system calls that adjust memory mappings.

11. The method of claim 7, further comprising copying system call arguments from a syscall buffer of the enclaved container to a syscall buffer of the untrusted OS.

12. The method of claim 11, further comprising copying modified system call arguments from the syscall buffer of the untrusted OS to the syscall buffer of the enclaved container.

13. A non-transitory computer-readable medium containing computer executable instructions that, when executed by a processor, cause the processor to perform a method for protecting an application from an untrusted operating system (OS), the method comprising:
- determining that a virtual address for a page of memory allocated by the untrusted OS for the application belongs to a valid mapping;
- determining that the page of memory is not already in use; and
- in response to determining that the virtual address for the page of memory belongs to a valid mapping and determining that the page of memory is not already in use, mapping the page of memory to an enclaved container for the application;
- making active a first nested page table of the untrusted OS such that the untrusted OS is unable to access private physical memory mapped into a second nested page table of the enclaved container for the application; and
- while the first nested page table is active:
  - transferring CPU control to the untrusted OS so that the untrusted OS can perform exception handling for the application;
  - verifying that an exception return address corresponds to a trusted exception vector;
  - determining that a running task belongs to the enclaved container; and
  - in response to determining that the running task belongs to the enclaved container, making active the second nested page table so that the task can access a memory state of the second nested page table.

14. The non-transitory computer-readable medium of claim 13, wherein the method further comprises unmapping the page of memory from the untrusted OS.

15. The non-transitory computer-readable medium of claim 13, wherein determining that the virtual address for the page of memory belongs to a valid mapping is based on a list of valid mappings for the application.

16. The non-transitory computer-readable medium of claim 15, wherein the list of valid mappings is built by interposing on system calls that adjust memory mappings.

17. The non-transitory computer-readable medium of claim 13, wherein the method further comprises copying system call arguments from a syscall buffer of the enclaved container to a syscall buffer of the untrusted OS.

18. The non-transitory computer-readable medium of claim 17, wherein the method further comprises copying modified system call arguments from the syscall buffer of the untrusted OS to the syscall buffer of the enclaved container.

* * * * *